Nov. 26, 1963 A. LEMOS Re. 25,483

ELECTRICAL DEVICES FOR THE APPLICATION OF FLUID TO THE GUMS

Original Filed Nov. 8, 1960

INVENTOR.
Albano Lemos
BY James N. Lyles.
Attorney

United States Patent Office

Re. 25,483
Reissued Nov. 26, 1963

25,483

ELECTRICAL DEVICES FOR THE APPLICATION OF FLUID TO THE GUMS

Albano Lemos, 6404 SW. 16th St., West Hollywood, Fla.

Original No. 3,048,170, dated Aug. 7, 1962, Ser. No. 67,986, Nov. 8, 1960. Application for reissue Oct. 3, 1962, Ser. No. 229,270
7 Claims. (Cl. 128—172.1)

Matter enclosed in heavy brackets [ ] appears in the original patent but forms no part of this reissue specification; matter printed in italics indicates the additions made by reissue.

This invention relates to a device for treating the gums in a manner to reduce the sensitivity caused in teeth primarily because of gum recession.

It is an object of the invention to provide a device of this character which can be used to advantage by the sufferer, the device being effective to greatly relieve the pain and annoyance caused by gum recession.

It is an objct of the invention to provide a device which shall have a self-contained source of electrical energy, and which shall, through the medium of a brush, or other liquid-carrying element, cause a liquid solution or medicament carried by the brush, to be electrically dispersed at the point of contact of the brush with the gums.

It is an object of the invention to provide a small and compact device of this kind, readily carried by and handled by the patient for self use and application when and where required.

More particularly, the invention contemplates the provision of a device which, by application of a suitable fluid to the dentine and cementum during the imposition of a negative electrical charge thereon, shall provide electrical stimulation which will aid materially in increasing the penetrating effect of the fluid, thus promptly relieving the pain.

The invention contemplates the provision of a metallic barrel or casing containing batteries arranged end-to-end and having their positive pole electrically connected to the barrel or casing. The negative pole of the batteries is electrically connected to the metallic ferrule of a brush or a similar filamented, or other type applicator. With an arrangement as described, current will flow from the positive pole of the batteries, through the ground including the body of the user engaged in holding the device to reach the brush applicator then charged with a suitable liquid solution or medicament.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a longitudinal sectional view through the device;

Figure 1:
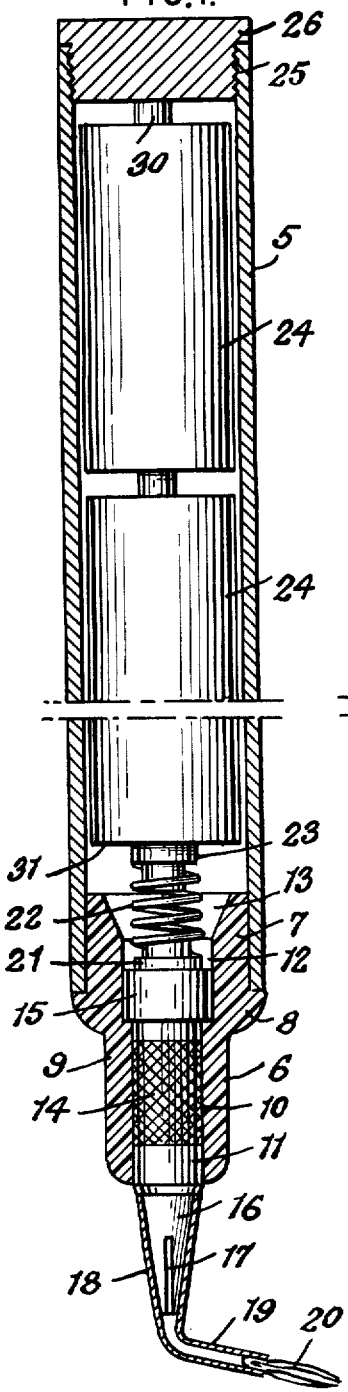

Referring to the drawing, 5 indicates an elongated cylindrical barrel forming the casing of the device and constituting a receptacle for holding a plurality of dry cell batteries 24 arranged in end-to-end relation. The barrel or casing 5 is open at its opposite ends, as shown in the drawing.

Figure 2:
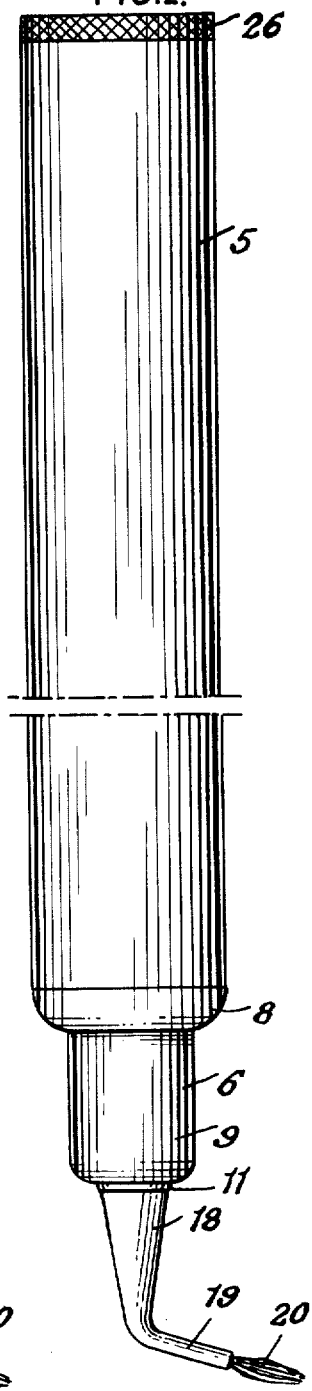
FIG. 2 is an elevational view of the device.

Fixedly mounted in one end of the barrel 5, as by a friction or press fit, is a plug 6 which is preferably composed of plastic, hard rubber or other suitable non-conducting material. The plug 6 is provided with a hub portion 7, an enlarged collar 8 and a reduced sleeve portion 9. When the plug 6 is fitted in the end of the barrel as shown in FIGS. 1 and 2, the collar 8 is flush with the outer diameter of the barrel.

Figure 3:
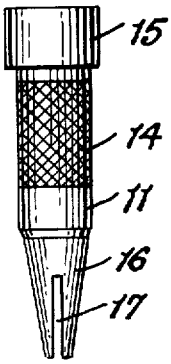
FIG. 3 is an elevational view of the shaft.

The plug 6 is provided with an axial bore 10 to receive a metallic shaft 11, shown separately in FIG. 3. The plug 6 is further provided with a relatively enlarged bore 12 which terminates inwardly in a conical concentric recess 13. The shaft 11 is preferably knurled upon a portion of its outer surface, as shown at 14, to be frictionally engaged within the bore 10 in a press fit that prevents axial displacement of the shaft. The shaft is provided at one end with an enlarged head portion 15 that seats in the bottom of the bore 12. At its opposite end, the shaft 11 is formed with a tapered, frustro-conical extension or tip 16 which is bifurcated or longitudinally split, as indicated at 17, to provide for resiliency or springiness in this tip portion of the shaft.

Figure 4:
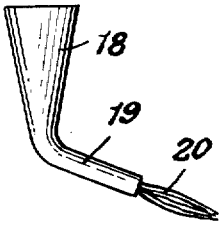
FIG. 4 is an elevational view of the brush that is adapted to be fitted on the end of the shaft.

Adapted for removable fitment upon the tapered or tip portion 16 of the shaft 11, is a conical ferrule 18 constituting a part of a brush holder. Extending at an angle from the ferrule 18 and thus forming an off-set extension thereof, is a tubular sleeve portion 19 which holds the bristles or filaments 20 of the brush and from which portion the bristles project substantially as shown in FIGS. 1, 2 and 4. The shaft 11 is composed of metal, as is the ferrule 18 and its bristle-holding extension 19.

Disposed in contacting relation with the head 15 of the shaft 11 is a metallic button 21 connected with a compressible spring 22. At its opposite end, the spring 22 is provided with a contact button 23.

The batteries 24, located within the barrel 5, are preferably a plurality of relatively short and slender type of dry cell batteries and are arranged in end-to-end contacting relation, with the batteries disposed in a manner to position their negative ends downwardly or in a direction toward the spring 22. The spring 22 biases the batteries in electrical contact through the length of the barrel. The opposite, or rear end, of the barrel is internally threaded at 25 to receive a closure cap 26 composed of metal. The cap 26 serves to force the several batteries 24 into contacting engagement by compressing the spring 22 when the cap 26 is screwed into closure position. The barrel 5 is preferably formed of a light weight metal, such as aluminum, which has a high degree of electrical transmission, and with the barrel constituting the handle whereby the user can hold and manipulate the device with one hand. The tapered end or tip 16 of the shaft 11 projects axially beyond the reduced portion 9 of the plug 6 and is thus exposed in a manner to permit the conical ferrule 18 of the brush to be readily slip-fitted on it and be retained thereon by frictional fit aided by the bifurcated formation of the tapered end 16.

As will be noted from FIG. 1, the batteries are so positioned in the barrel that the positive pole 30 of the rearmost battery contacts with the cap 26 while the negative end 31 of the foremost battery contacts with the bottom 23. The contact between the several batteries is such that the positive pole of each battery engages against the negative pole of that located behind it, with the positive pole 30 of the rearmost battery disposed in contact with the cap 26, as just explained.

Before using the device, the brush filaments 20 are dipped into a liquid solution, which can, for example, be sodium fluoride, sodium chloride, or any other suitable fluid which has been found efficaceous in gum treatments for desensitizing purposes. The liquid with which the brush is thus charged, has electrical conductivity and hence will conduct a negative charge of electricity to the gums or teeth areas when the bristles are applied thereto.

After brush is dipped into the liquid, the user grasps the barrel 5 in one hand and applies the bristles of the brush against the gums and bases of the teeth within the sensitive area. The bristles of the brush can enter between the teeth so that liquid carried by the bristles will be applied thereto. When the brush is thus applied, current flows from the positive pole 30 of the batteries, through the cap 26, barrel 5, through the ground including the body of the user, to the brush holder 18 by way of the liquid-charged bristles 20 and to shaft 11 to the negative pole 31 of the batteries. A negative charge of electricity is thus applied to the gums in and around the bases of the teeth and the solution or medicament with which the brush is charged is thus electrically penetrably applied at the point or points of sensitivity.

Tests made with this device have indicated that the application of a de-sensitizing fluid to the dentine and cementum while the gums are being subjected to a negative electrical charge results in stimulation of the gums to an extent to materially increase the penetrability of the fluid with a marked increase in its effectiveness. Very beneficial results for lengthy periods of time have been secured.

The device is small and easily portable and can thus be available for immediate use whenever required. The batteries are preferably of a standard, easily-procurable type and when fitted in the barrel provide a self-contained source of current. The brush is removable, inexpensive and easily replaced and its ready removability permits of sterilization if it is found necessary or desirable.

While it has been herein suggested that the liquid-applying means shell be a fibred or filamented element, such as a brush, a liquid-carrying sponge, pad or other conveyor of the liquid to the point of application could be used. However, for most purposes, a soft-bristled brush is probably the most desirable since its bristles or filaments more readily extend between the teeth and into gum recesses.

Having thus described a single embodiment of the invention, it is obvious that the same is not to be restricted thereto, but is broad enough to cover all structures coming within the scope of the annexed claims.

What I claim is:

1. An electrical device for the application of a fluid to the dentine and cementum comprising, a tubular metallic casing, a plurality of batteries placed end-to-end in the casing, the rearmost battery therein having its positive electrode in electrical contact with the casing, the foremost battery in the casing having its positive electrode in contact with the negative electrode of the rearmost battery, a plug of insulating material fitted in the front end of the casing and having a tubular extension projecting forwardly of the casing, the plug having a larger-diameter rear portion fitting within the casing, the plug having an axial passage extending through it, said passage having a seat provided in its larger-diameter portion, a shaft extending through the passage, said shaft having a head at one end disposed against the seat, the foremost battery having a negative electrode extending toward the head, a contact spring disposed between the negative electrode of the foremost battery and the head and establishing electrical contact between the said electrode and the head, the shaft having a tapered forward end extending beyond the plug, said tapered end being split, a sleeve provided with a brush at one end and a conical cup at its other end, said cup being adapted for removable fitment over the split end of the shaft.

2. An electrical device for the application of a fluid to the dentine and cementum comprising, a metallic handle-forming barrel open at its opposite ends, a metal cap closing one end of the barrel, batteries disposed in the barrel and having a positive pole in contact with the cap to thereby form the handle into a positive electrode, a plug of non-conducting material fitted in the opposite end of the barrel and provided with an axial passage, a metallic shaft extending through said passage, said shaft having a head on its inner end within the barrel, means extending between said head and the negative pole of the batteries for electrically connecting the negative pole of the batteries with said head, the opposite end of the shaft extending beyond the forward end of the plug, and a brush provided with a tubular ferrule fitted on the extended part of the shaft, the brush including filaments which, when charged with a fluid serve to establish a negative electrical charge between the shaft and the surface of the gums against which the filaments are applied.

3. An electrical device for the application of a fluid to the dentine and cementum comprising, a metal barrel, batteries contained within the barrel and having a positive pole establishing electrical contact with the barrel, a shaft located at one end of the barrel and electrically insulated therefrom, a plug of insulating material fitted in the end of the barrel and interposed between the shaft and barrel and insulating the shaft from the barrel, the shaft having an outer end projecting beyond the plug and having an inner end facing toward the interior of the barrel, the batteries having a negative pole disposed adjacent to the inner end of the shaft, a spring for establishing contact between said negative pole and the inner end of the shaft, and a brush having a metal ferrule fitted on the projecting end of the shaft and connected thereto to receive a negative electrical charge from the batteries, the brush having bristles which, when charged with a liquid and applied to the gums will conduct the negative charge thereto.

*4. An electrical device for the application of a fluid to the dentine and cementum comprising, a metal barrel containing battery means and to which the positive pole of the battery means is electrically connected, a plug of electric current insulating material secured to one end of the barrel, an electric current conducting shaft carried by said plug and electrically connected at its inner end to the negative pole of the battery means, the outer end of the shaft extended outwardly of said plug, and a liquid carrying element carried by the outer end of said shaft, the said liquid carrying element when applied to a gum area being adapted to conduct the negative charge thereto.*

*5. The device of claim 4 wherein the liquid carrying element is a brush having bristles extendable between the teeth of the user.*

*6. An electrical device for the application of a fluid to the dentine and cementum comprising, a metal barrel containing battery means and to which the positive pole of the battery means is electrically connected, a plug of electric current insulating material secured to one end of the barrel, the said plug having a central bore, and an electric current conducting shaft extending through said bore and electrically connected at its inner end to the negative pole of the battery means, the outer end of the shaft extended outwardly of said plug, and a liquid carrying element carried by the outer end of said shaft, the said carrying element when applied to a gum area being adapted to conduct the negative charge thereto.*

*7. The device of claim 6 wherein the liquid carrying element is a brush having bristles extendable between the teeth of the user.*

References Cited in the file of this patent or the original patent

UNITED STATES PATENTS

| | | |
|---|---|---|
| 717,035 | Shaffer | Dec. 30, 1902 |
| 789,161 | Linn | May 9, 1905 |
| 870,927 | Boyd | Nov. 12, 1907 |
| 954,083 | Gay | Apr. 5, 1910 |
| 2,100,234 | Belknap | Nov. 23, 1937 |
| 2,834,344 | Kanai | May 13, 1958 |
| 2,949,107 | Ziegler | Aug. 16, 1960 |
| 3,019,787 | Simmons | Feb. 6, 1962 |

FOREIGN PATENTS

| | | |
|---|---|---|
| 654,901 | France | Dec. 7, 1928 |